UNITED STATES PATENT OFFICE.

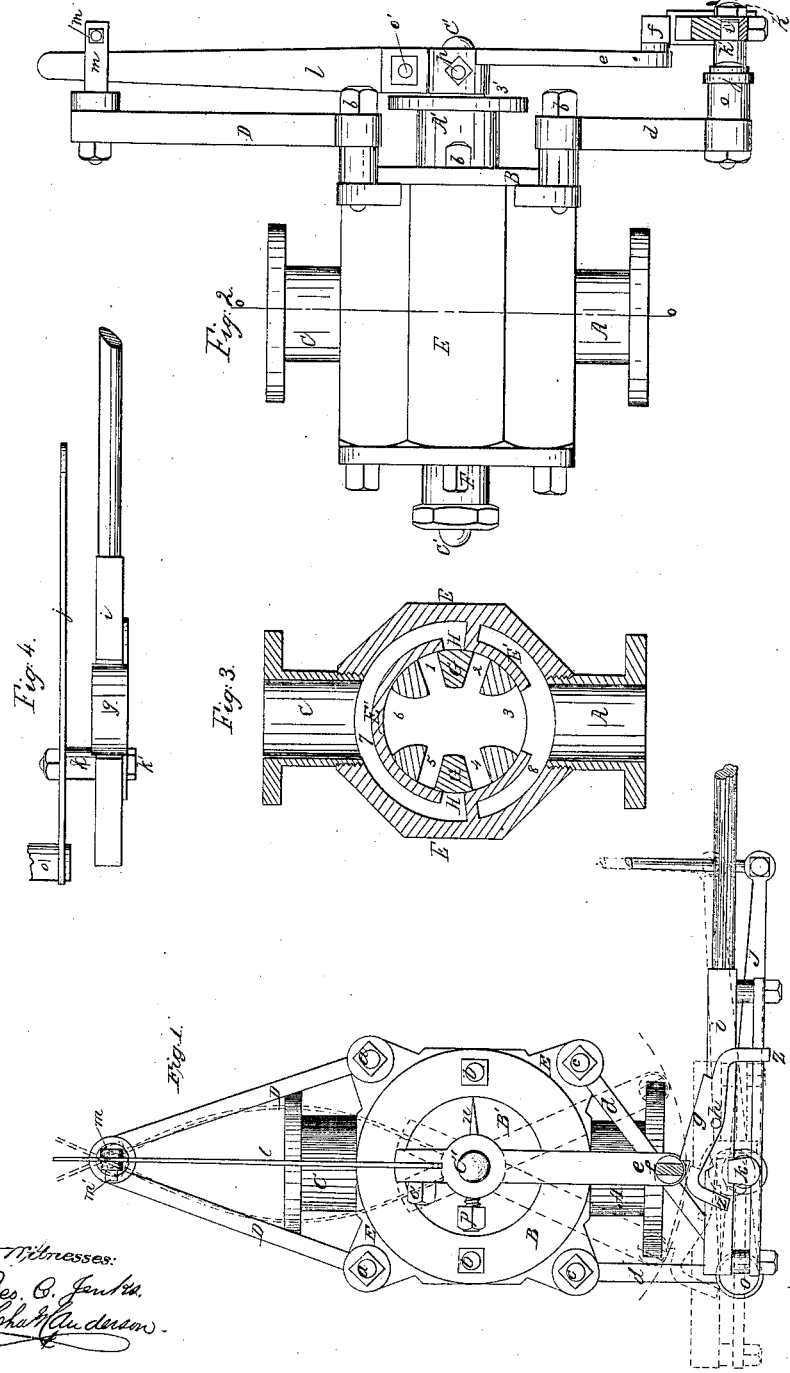

ROBERT STEWART, OF ELMIRA, NEW YORK.

IMPROVEMENT IN CUT-OFF AND REGULATOR VALVES.

Specification forming part of Letters Patent No. 38,610, dated May 19, 1863.

*To all whom it may concern:*

Be it known that I, ROBERT STEWART, of Elmira, Chemung county, State of New York, have invented a new and useful Steam Cut-Off and Regulator Valve for Steam-Engines; and I do hereby declare that the following is a full, clear, and exact description thereof, reference being had to the letters of reference on the annexed drawings, making a part of this specification.

In the drawings, Figure 1 is a front elevation. Fig. 2 is a side elevation. Fig. 3 is a vertical cross-section through red line *o o*, Fig. 2. Fig. 4 is a plan view of the arm or lever *i*, lever *j*, and dog *g*.

To enable those skilled in the art to make and use my invention, I will describe its construction and operation.

In the drawings similar characters designate like parts.

In the construction of my invention, A is the eduction-pipe; B, the end or head of the valve; C, the induction-pipe; D, braces to which the spring is attached; *a*, screws for fastening hangers D in place; *b*, screws for securing head to valve; *c*, screws for supporting brackets *d*; *e*, the arm attached to spring *l*, on the lower end of which is catch or stop *f*, against which dog *g* strikes in passing and repassing to operate the valve; *k*, the wrist on which slide *i* moves; *j*, the lever attached to the governor, and having a wrist, *k*, with a wrist-cam, *k'*, attached firmly to it. Slide *i* moves reciprocatingly on wrist *k*. *h* is the pivot on which the dog *g* oscillates or rocks when pressed against cam *k'*; *o*, the fulcrum of lever *i*; *l*, the spring; *m*, the slotted wrist, in which spring *l* is secured by the thumb-screw *m'*; B', the index-plate; *n*, the index-pointer; *p*, the thumb-screw for fastening the arm *e* to the valve-shaft C'. E is the outer shell of the valve; E', the inner shell; A', bearing of the valve; F, the rear bearing of the valve; *o'*, the screw for fastening spring *l* to the arm *e*.

In Fig. 3 1, 2, 3, 4, and 5 designate the ports of the valve. 7 is the chamber between the shells of the valve where the steam enters before it passes the ports into the valve. 8 is the chamber between said shell whence the steam escapes after passing through the valve-ports.

In the operation of my invention, the valve is set upon the steam-chest, as usual. The steam is then applied at full pressure from the boiler, entering at the top of the valve, (at C, Fig. 3,) passing into the chamber 7 and through the ports 1, 2, 4, and 5, and escaping at 3. The steam thus let in is cut off by means of the sliding bar *i*, (on which is dog *g*,) which is attached to lever *j*, which is suitably connected to the governor. The motion of the governor regulates the distance or degree the valve is opened by the degree of bite or hold that the dog *g* has on the stop *f* on rod *e*. It will be seen that as the dog *g* is caused to traverse in a reciprocating movement, it is also raised or lowered by the action of the governor on the lever *j*, and is thereby made to take a greater or less hold on the stop *f*, and in the same proportion to move the rod *e* more or less to the right or left, thus proportionally opening the ports and letting on more or less steam, as may be required. As soon as the dog *g* slides off from the stop *f* in passing to the right or left, the ports are instantly closed, as at G, Fig. 3, by means of the spring *l*, which throws back the rod *e* to a vertical position, which closes the ports by making that part of the valve marked G lap over and cut off the throat H cut through the inner shell.

The red lines indicate the extreme right and left positions of the spring *l* and rod *e*, and stop *f*. As the dog *g* traverses to and fro, it will be seen that its projecting points *z*, dipping down at each end, are made to strike against wrist-cam *k'*, thereby alternately raising and depressing the heads of the dog, throwing it into position to bite or operate against the stop *f*.

The operation of the dog *g*, lever *j*, and sliding rod *i* are clearly shown by red lines in Fig. 1. The advantages gained by this arrangement are that the steam can follow the piston to any distance in the cylinder by using the full throw of the eccentric, and at the same time be cut off at any point of the stroke, and thereby regulate the motion. Further advantages are gained by the saving of steam and a more regular motion and application of the power of the engine. In the use of any known valve the whole pressure of the steam is on the valve at all times, and at the "dead-points" of the crank the pressure is greatly increased, inasmuch as the steam has a retarded motion at this time. By means of my improved cut-off the rod *e*, which opens the valve, is moved at the same instant that the lower valve opens, and when cut off at any point it cuts off the communication of the boiler with the cylinder, and consequently takes off the friction from the valve in passing the dead-points, thus giving the engine a more uniform motion. It will be seen that the valve is cut away at 6, as at 3, so as to preserve its balance and to diminish the surface upon which the steam acts, and to lessen its friction-surface against the shell E'.

I have by experience on several engines found that by my invention a very great amount of power is saved, while at the same time a regularity of motion is given not heretofore obtained by any engine using any of the known valves or cut-offs.

Having thus fully described the construction and operation of my invention, what I claim as new, and desire to secure by Letters Patent, is—

1. The arm $e$, composed of spring $l$ and pin $f$, and this arm thus constructed in combination with a cut-off valve.

2. The lever $j$ and dog $g$, operating as described, and these also in combination with each other, for the purposes set forth.

3. The combination of the arm, as described in claim 1, and the lever $j$ and dog $g$, as claimed in claim 2, operating substantially in the manner and for the purposes hereinbefore specified.

In testimony that I claim the above I hereunto set my hand.

ROBERT STEWART.

In presence of—
   Jo. C. CLAYTON,
   A. A. YEATMAN.